(12) United States Patent
Ishihara (10) Patent No.: US 12,404,893 B2
(45) Date of Patent: Sep. 2, 2025

(54) DRIVING DEVICE (71) Applicant: HI-LEX CORPORATION, Takarazuka (JP)

(72) Inventor: Hironari Ishihara, Hyogo (JP)

(73) Assignee: HI-LEX CORPORATION, Takarazuka (JP)

( * ) Notice: Subject to any disclaimer, the term of this patent is extended or adjusted under 35 U.S.C. 154(b) by 23 days.

(21) Appl. No.: 18/247,990

(22) PCT Filed: Oct. 8, 2021

(86) PCT No.: PCT/JP2021/037319
§ 371 (c)(1),
(2) Date: Apr. 5, 2023

(87) PCT Pub. No.: WO2022/075446
PCT Pub. Date: Apr. 14, 2022

(65) Prior Publication Data
US 2023/0375034 A1   Nov. 23, 2023

(30) Foreign Application Priority Data

Oct. 8, 2020 (JP) ................. 2020-170698

(51) Int. Cl.
*F16C 1/16* (2006.01)
*F16H 19/04* (2006.01)

(52) U.S. Cl.
CPC .............. *F16C 1/16* (2013.01); *F16H 19/04* (2013.01); *F16C 2300/02* (2013.01); *F16C 2300/28* (2013.01)

(58) Field of Classification Search
CPC .... F16C 1/16; F16C 2300/02; F16C 2300/28; F16H 19/04; F16H 2057/02034; H02K 7/116; H02K 7/1163
(Continued)

(56) References Cited

U.S. PATENT DOCUMENTS 2,796,856 A * 6/1957 Gratzmuller ............ F16H 19/04
267/168
4,702,117 A * 10/1987 Tsutsumi ................ E05B 81/25
254/230
(Continued)

FOREIGN PATENT DOCUMENTS

JP    H01-126436 A    5/1989
JP     5-187159 A    7/1993

OTHER PUBLICATIONS

English translation of JP H05187159 A (Year: 1993).*
(Continued)

*Primary Examiner* — Joseph Brown
(74) *Attorney, Agent, or Firm* — Shih IP Law Group, PLLC.

(57) ABSTRACT

A driving apparatus includes a casing, a driving section, a slider, a coil spring, and a cable including a cable end. The slider includes an engaging section to which the cable end is attached and a spring accommodating section accomodating a part of the coil spring; the slider moves in association with the cable when moving to one side of moving direction by a driving force of the driving section, and moves relative to the cable when moving to the other side of moving direction by a biasing force of the coil spring; and when the slider moves to the other side of moving direction by the biasing force of the coil spring, the coil spring extends while accommodating the cable end in an inner space of the coil spring, thereby reducing the size of the slider and the size of the entire apparatus.

7 Claims, 8 Drawing Sheets (58) Field of Classification Search
USPC .................................................. 74/29, 89.17
See application file for complete search history.

(56) References Cited

U.S. PATENT DOCUMENTS

| | | | |
|---|---|---|---|
| 6,739,633 B2* | 5/2004 | Holloway | E05B 83/34 |
| | | | 292/201 |
| 6,932,324 B2* | 8/2005 | Biller | B60R 22/1952 |
| | | | 297/480 |

OTHER PUBLICATIONS

English translation of JP H01126436 A (Year: 1989).*
International Search Report from International Application No. PCT/JP2021/037319 mailed Nov. 22, 2021, 4 pages.

* cited by examiner

DRIVING DEVICE

TECHNICAL FIELD

The present invention relates to a driving apparatus.

BACKGROUND ART

There is known an actuator that uses the driving force of a driving section to move a slider accommodated in a casing and drive a cable connected to the slider (for example, see Patent Literature (hereinafter, referred to as PTL) 1). The actuator in PTL 1 includes a casing and a rack plate (slider) that is slidably provided in the casing and to which respective ends of a pair of cables are engaged and connected. In this actuator, the rotational force of an output gear, to which the driving force of a motor is transmitted, is transmitted to a rack section of the rack plate, and the rack plate moves back and forth in the casing, thereby applying an operating force to each of the pair of cables according to the moving direction of the rack plate.

After the cables are operated so that one of the cables is pulled into the casing due to the movement of the rack plate by the driving force of the motor, the rack plate returns to its initial position by the biasing force of a coil spring. When the cable moves in association with the rack plate during the movement of the rack plate to the initial position, the cable possibly buckles under the pressure in the axial direction from the rack plate. In this regard, in PTL 1, the rack plate includes an engaging groove extending in the moving direction of the rack plate so that the cable does not move in association with the rack plate during the movement of the rack plate to the initial position while the rack plate moves relative to the end of the cable. When the rack plate moves in one direction by the driving force of the motor, the end of one cable engages with the end of the engaging groove, the end of the cable moves in one direction with the rack plate, and the cable is pulled into the casing. When the motor stops and the rack plate starts moving back to the initial position by the biasing force of the coil spring, the end of the cable hardly moves. At this time, the movement of the rack plate causes the end of the cable to move relative to the rack plate in the engaging groove formed on the rack plate. Note that the cable is configured to return to its initial position by a biasing member, such as a spring, provided on the end of the cable on the side of the object to be operated (the end opposite to the end engaging with the rack plate).

CITATION LIST

Patent Literature

PTL 1
Japanese Patent Application Laid-Open No. H05-187159

SUMMARY OF INVENTION

Technical Problem

As described above, in the actuator of PTL 1, the rack plate (slider) needs to be provided with the engaging groove that engages the end of the cable in addition to a concave section that accommodates the coil spring, causing the rack plate to be larger in size. As a result, the casing that accommodates the rack plate and the whole apparatus become larger in size.

With this regard, it is an object of the present invention to provide a driving apparatus including a slider that moves in one direction in association with a cable by the driving force of a driving section, moves in the other direction by the biasing force of a coil spring, and moves relative to the cable during the movement in the other direction, and to reduce the size of the slider and reduce the size of the whole apparatus.

Solution to Problem

A driving apparatus of the present invention includes: a casing; a driving section; a slider that moves in the casing along a predetermined moving direction due to a driving force of the driving section; a coil spring that biases the slider in one direction; and a cable that includes a cable end directly or indirectly attached to the slider, wherein, the slider includes: an engaging section to which the cable end is directly or indirectly attached; and a spring accommodating section that extends along the moving direction and accommodates a part of the coil spring, the slider moves in association with the cable when the slider moves to one side of the moving direction due to the driving force of the driving section, and moves relative to the cable when the slider moves to another side of the moving direction due to a biasing force of the coil spring, the coil spring accommodated in the spring accommodating section and the cable are coaxially placed along the moving direction of the slider, and the coil spring is configured to expand, when the slider moves to the another side of the moving direction due to the biasing force of the coil spring, while accommodating the cable end of the cable in an inner space that is inside an inner circumference of the coil spring.

Advantageous Effects of Invention

According to the driving apparatus of the present invention, it is possible to provide a driving apparatus including a slider that moves in one direction in association with a cable by the driving force of a driving section, moves in the other direction by the biasing force of a coil spring, and moves relative to the cable during the movement in the other direction, and to reduce the size of the slider and reduce the size of the whole apparatus.

DESCRIPTION OF EMBODIMENTS

Hereinafter, a driving apparatus according to an embodiment of the present invention will be described in detail with reference to the accompanying drawings. Note that the following embodiments are merely examples, and the driving apparatus of the present invention is not limited thereto.

Embodiment 1

Figure 1:
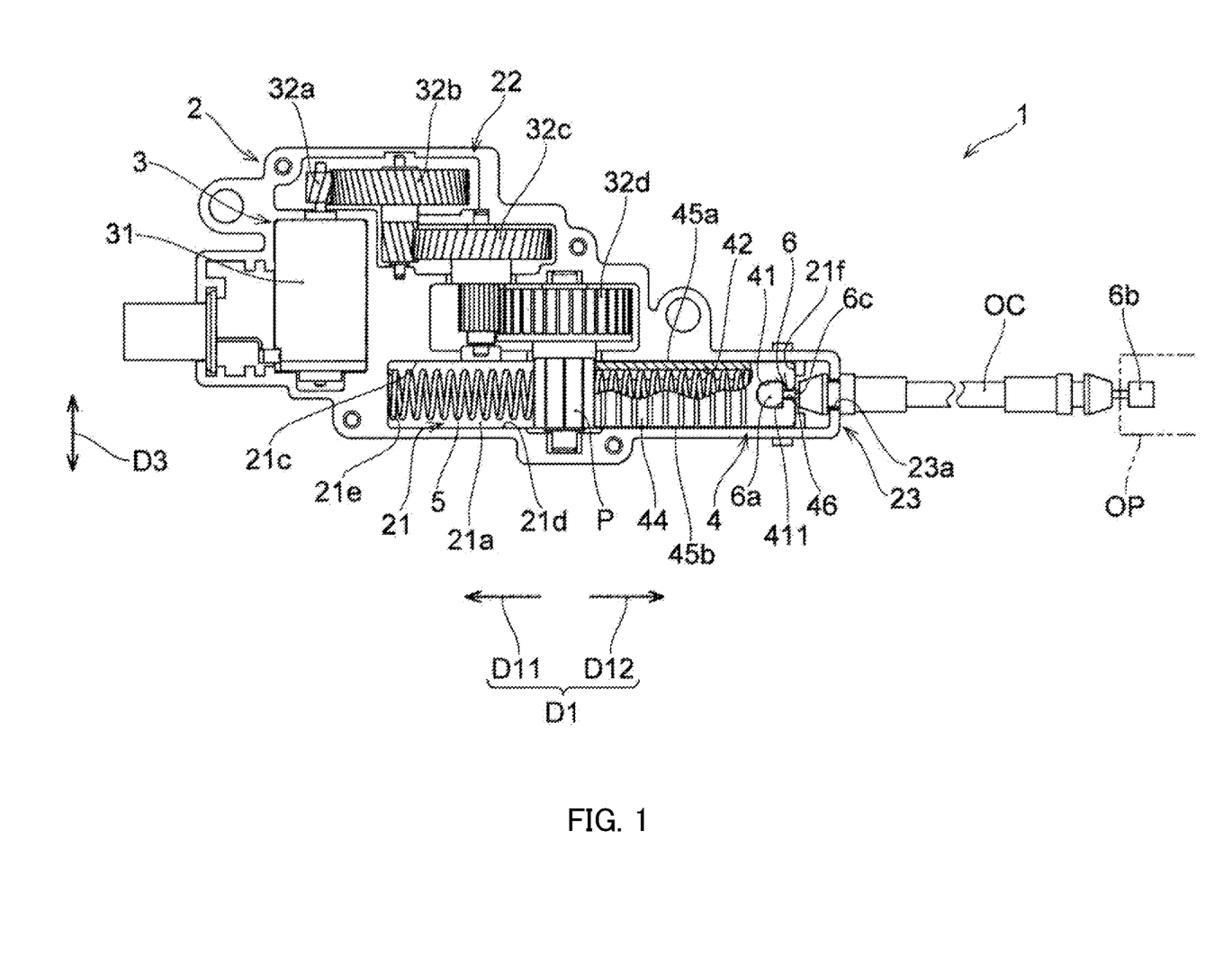
FIG. 1 is a top view illustrating the initial state of a driving apparatus according to Embodiment 1 of the present invention.

As illustrated in FIG. 1, driving apparatus 1 of the present embodiment includes casing 2, driving section 3, slider 4 that moves along predetermined moving directions D1 in casing 2 by the driving force of driving section 3, coil spring 5 that biases slider 4 in one direction, and cable 6 with cable end 6a attached directly or indirectly to slider 4.

Driving apparatus 1 moves slider 4 in moving directions D1 by the driving force of driving section 3 to move cable 6 connected directly or indirectly to slider 4. In the present embodiment, driving apparatus 1 is configured to operate operation object OP connected to cable 6. To be more specific, as described later, when slider 4 is moved in first moving direction D11, which is one direction of moving directions D1, by the driving force of driving section 3 and cable 6 is pulled in first moving direction D11 (see FIG. 5), operation object OP is operated by cable 6. When the driving force of driving section 3 is released, slider 4 is moved in second moving direction D12, which is opposite to first moving direction D11, by the biasing force of coil spring 5, and slider 4 is returned to the initial position illustrated in FIG. 1. Note that the numbers of the coil springs and cables provided in driving apparatus 1 are not particularly limited although only one coil spring 5 and one cable 6 are provided in driving apparatus 1 in the present embodiment. For example, driving apparatus 1 may be provided with two cables, such as a manual cable and an electric cable as in the embodiment to be described below.

The use of driving apparatus 1 is not particularly limited as long as slider 4 can be moved by the driving force of driving section 3 to move cable 6 connected to slider 4. To be more specific, driving apparatus 1 may be an unlocking driving apparatus for unlocking a lock device in a case where operation object OP is a lock device of a reclining mechanism of a vehicle seat or a lock device of a fuel lid, for example.

Note that, in this specification, directions of the movement of slider 4 are referred to as moving directions D1, one direction perpendicular to moving directions D1, in particular, a direction perpendicular to the bottom surface (sliding surface) 21a (see FIG. 2) on which slider 4 slides is referred to as height direction D2, and a direction perpendicular to both moving directions D1 and height direction D2 is referred to as width direction D3.

Cable 6 is connected to slider 4 and is operated by the movement of slider 4. In the present embodiment, as illustrated in FIG. 1, cable 6 includes cable end 6a provided on one end side of cable 6, cable end 6b provided on the other end side of cable 6, and cable body 6c. In the present embodiment, cable end 6a of cable 6 is connected to slider 4, and cable end 6b on the other end side of cable 6 is connected to operation object OP. In the present embodiment, cable 6 is an inner cable of a control cable, and cable 6 is inserted through outer casing OC of the control cable. Cable 6 is routed in a predetermined routing path by outer casing OC in a mounting object such as a vehicle body. Note that cable 6 includes only one cable in the present embodiment, but two cables may be provided as in the embodiment described later. Further, unlike the embodiment to be described later, another cable operated by the movement of slider 4 may be provided in addition to cable 6 by changing the number of the coil springs and how the coil springs are placed.

Casing 2 accommodates some components of driving apparatus 1. To be more specific, casing 2 accommodates driving section 3, slider 4, and coil spring 5 as illustrated in FIG. 1. In the present embodiment, casing 2 includes slider accommodating section 21 that slidably accommodates slider 4 and driving section accommodating section 22 that accommodates driving section 3 as illustrated in FIG. 1. In addition, casing 2 includes cable lead-in part 23 that leads cable 6 into casing 2 on one side (second moving direction D12 side) of slider accommodating section 21 in moving directions D1. Note that, in the present embodiment, casing 2 includes first casing member 2A and second casing member 2B (see FIG. 2) that can be opened and closed with respect to each other, and is configured to accommodate the components inside by closing second casing member 2B with respect to first casing member 2A. The overall shape and configuration of casing 2, however, are not particularly limited.

Figure 2:
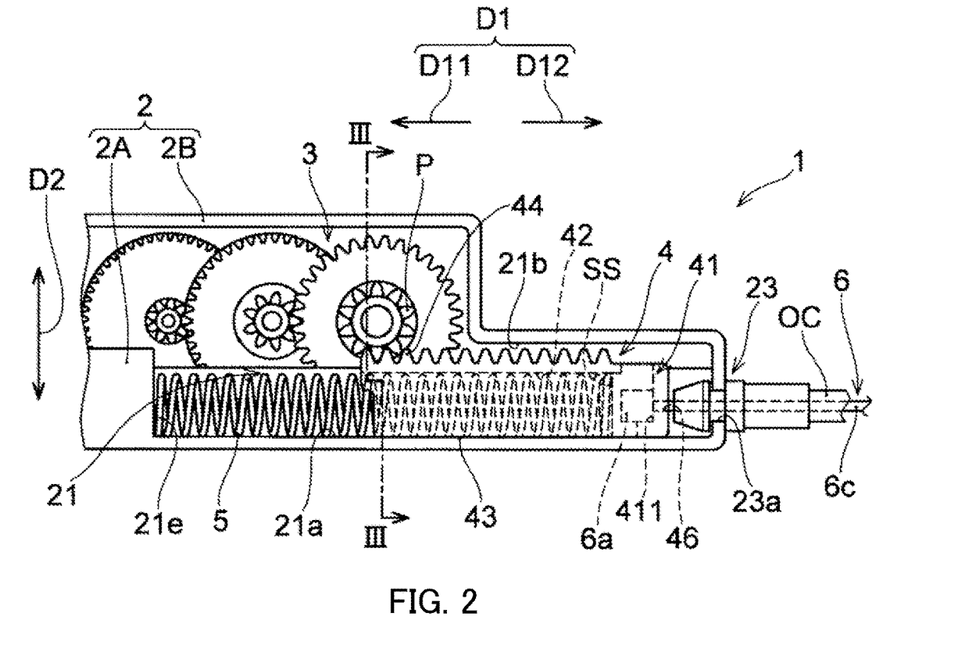
FIG. 2 is a schematic side view illustrating a part of the driving apparatus in FIG. 1.
Figure 3:
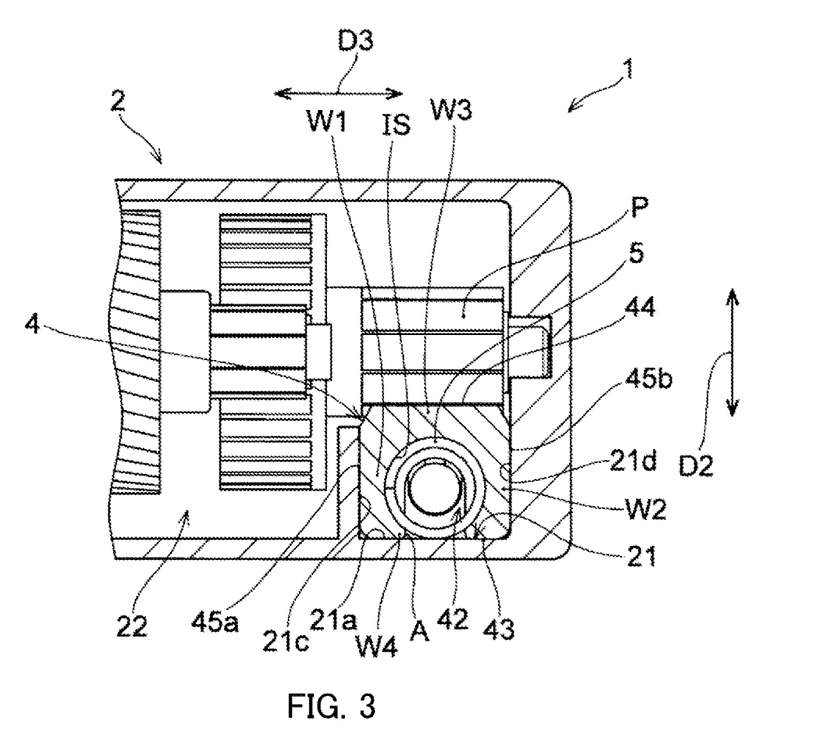
FIG. 3 is a fragmentary cross sectional view of the driving apparatus with a slider cut along the line in FIG. 2.

Casing 2 includes sliding surface 21a on which slider 4 slides. To be more specific, as illustrated in FIG. 1 and FIG. 3, casing 2 (slider accommodating section 21) includes sliding surface 21a and a pair of guide walls 21c and 21d (see FIG. 1 and FIG. 3) that extend substantially perpendicular to sliding surface 21a and along moving directions D1 of slider 4. In the present embodiment, sliding surface 21a and the pair of guide walls 21c and 21d are provided in slider accommodating section 21. Slider accommodating section 21 has an internal space in which slider 4 can slide in moving directions D1 at a predetermined stroke. In the present embodiment, the internal space of slider accommodating section 21 is a substantially rectangular parallelepiped space and defined by the bottom surface serving as sliding surface 21a of slider 4 (hereinafter, also referred to as bottom surface 21a), upper surface 21b (see FIG. 2) facing bottom surface 21a, side walls serving as the pair of guide walls 21c and 21d provided on both sides of slider 4 in width direction D3 (see FIG. 3; hereinafter, also referred to as side walls 21c and 21d), and end walls 21e and 21f provided on both sides of slider 4 in moving directions D1 (see FIG. 1). In the present embodiment, bottom surface 21a is formed as a flat surface, but bottom surface 21a need not be a flat surface as long as slider 4 can slide on it. Side walls 21c and 21d are spaced apart by a width corresponding to the width of slider 4 in width direction D3. This allows side walls 21c and 21d to function as guiding sections for stably moving slider 4 along moving directions D1. In the present embodiment, the sliding surface is described as bottom surface 21a of casing 2, but the sliding surface may be a surface other than bottom surface 21a.

Cable lead-in part 23 is a section that leads cable 6 from the outside of casing 2 to the inside of casing 2 so that cable end 6a of cable 6 is connected to slider 4. To be more specific, cable lead-in part 23 is provided on one side (second moving direction D12 side) of slider accommodating section 21 in moving directions D1. Cable lead-in part 23 includes lead-in opening 23a that communicates the outside of casing 2 with the internal space of slider accommodating section 21. Cable 6 is lead from lead-in opening 23a of cable lead-in part 23 to slider accommodating section 21. In the present embodiment, cable lead-in part 23 is configured to engage with one end of outer casing OC to attach outer casing OC (see FIG. 1 and FIG. 2).

Driving section accommodating section 22 accommodates driving section 3 as illustrated in FIG. 1. To be more specific, driving section accommodating section 22 is provided in a position adjacent to slider accommodating section 21 in width direction D3 and communicates with slider accommodating section 21. In the present embodiment, driving section accommodating section 22 is configured to accommodate motor 31 of driving section 3 and a plurality of transmission members 32a, 32b, 32c, and 32d, as described later.

Driving section 3 generates the driving force for moving slider 4. In the present embodiment, driving section 3 includes motor 31 and one or more of transmission members 32a, 32b, 32c, and 32d as illustrated in FIG. 1. Motor 31 moves slider 4 in moving directions D1 by the rotational force of motor 31 via transmission members 32a, 32b, 32c, and 32d. In the present embodiment, transmission members 32a, 32b, 32c, and 32d are gears configured to be capable of transmitting the rotational force generated by motor 31 to slider 4. To be more specific, as illustrated in FIG. 1, driving section 3 includes pinion gear P that engages with slider 4 having rack section (power transmission section) 44 as described later and transmits the driving force of driving section 3 to slider 4. More specifically, an output shaft of motor 31 and transmission members 32a, 32b, 32c, and 32d are configured to rotate about rotational shafts extending in width direction D3, and pinion gear P of transmission member 32d is configured to engage with rack section 44 of slider 4 to move slider 4. Note that the configuration of driving section 3 is not limited to the illustrated configuration as long as the driving force for moving slider 4 can be generated. Driving section 3 is configured to transmit the rotational driving force to slider 4 in the present embodiment, but driving section 3 may be configured to transmit the linear driving force to slider 4, for example.

Slider 4 is movable in moving direction D1 (first moving direction D11) by the driving force of driving section 3 and operates cable 6 connected to slider 4. In the present embodiment, slider 4 includes engaging section 41 to which cable end 6a is directly or indirectly attached, and spring accommodating section 42 that extends along moving directions D1 and accommodates a part of coil spring 5, as illustrated in FIG. 1 and FIG. 2. Further, in the present embodiment, slider 4 includes sliding section 43 (see FIG. 2 and FIG. 3) that slides along sliding surface 21a of casing 2, and power transmission section 44 (see FIG. 2) that is connected to driving section 3 and to which the driving force of driving section 3 is transmitted. To be more specific, as illustrated in FIG. 1 and FIG. 3, slider 4 includes a pair of plate guided surfaces 45a and 45b that extend facing the pair of guide walls 21c and 21d, and rack section 44 that connects the pair of guided surfaces 45a and 45b and engages with pinion gear P.

The shape and configuration of slider 4 is not particularly limited as long as slider 4 can be moved in moving directions D1 by the driving force of driving section 3 and cable 6 connected to slider 4 can be operated. In the present embodiment, as illustrated in FIG. 1 and FIG. 2, slider 4 has a predetermined length in moving directions D1 and its cross-section perpendicular to moving directions D1 is substantially U-shaped (see FIG. 3). To be more specific, as illustrated in FIG. 3, slider 4 includes a pair of side walls W1 and W2 that are spaced apart in width direction D3 and have guided surfaces 45a and 45b, and upper wall W3 that connects the pair of side walls W1 and W2 in width direction D3 and has rack section 44. Slider 4 includes bottom wall W4 that is provided with sliding section 43 on a side opposite to upper wall W3 in height direction D2 of side walls W1 and W2. The pair of side walls W1 and W2 extend parallel to each other along moving directions D1 substantially perpendicularly to sliding surface 21a. As illustrated in FIG. 1, engaging section 41 is provided on one end side (second moving direction D12 side) of slider 4 in moving directions D1, and slider 4 includes cable insertion section 46 through which cable body 6c of cable 6 attached to engaging section 41 is inserted. In addition, the other end side (first moving direction D11 side) of slider 4 in moving directions D1 is opened so that coil spring 5 can be inserted into spring accommodating section 42 of slider 4 in moving directions D1.

Engaging section 41 is a section to which cable end 6a of cable 6 is directly or indirectly attached. In the present embodiment, engaging section 41 is provided at the end of slider 4 in moving directions D1 although the provided position of engaging section 41 is not particularly limited. To be more specific, engaging section 41 is configured from the upper wall W3 side of slider 4 to be able to attach cable end 6a, as illustrated in FIG. 1. In the present embodiment, cable end 6a is directly attached to slider 4 by engaging with engaging section 41 of slider 4. Note that cable end 6a may be indirectly attached to slider 4 via another member as long as cable 6 is operated with the movement of slider 4.

In the present embodiment, engaging section 41 is configured so that cable end 6a of cable 6 can engage in moving directions D1. In the present embodiment, cable end 6a is engaged with engaging section 41 on one side of moving directions D1, but not engaged on the other side of moving directions D1. To be more specific, the back end (cable body 6c side) of cable end 6a is engaged in moving directions D1 with wall portion 411 provided in engaging section 41, and the leading end of cable end 6a is not engaged with engaging section 41 in moving directions D1. Accordingly, when slider 4 is moved in first moving direction D11, for example, cable end 6a of cable 6 is pulled in first moving direction D11 while engaged with engaging section 41 (see FIG. 5). Meanwhile, when slider 4 moves in second moving direction D12 by the biasing force of coil spring 5 after cable 6 is moved in first moving direction D11, cable 6a of cable 6 is left in place without moving with slider 4, and slider 4 moves ahead in second moving direction D12 (see FIG. 6). Note that cable 6 moves in second moving direction D12 from the state illustrated in FIG. 6 to the initial position illustrated in FIG. 2 by a biasing member (not illustrated) provided on the operation object OP side.

Power transmission section 44 is a section configured to be able to transmit the driving force of driving section 3 to slider 4. In the present embodiment, the rotational motion of driving section 3 is transmitted to power transmission section (rack section) 44 of slider 4 and converted into the linear motion of slider 4. It may be configured, however, so that driving section 3 performs a linear motion, the linear motion of driving section 3 is transmitted to the power transmission section, and slider 4 performs a linear motion. In the present embodiment, power transmission section 44 is a rack section (hereinafter referred to as rack section 44) with which pinion gear P of transmission member 32d of driving section 3 is engaged, as illustrated in FIG. 2. To be more specific, rack section 44 is provided on a surface of slider 4 on the opposite side of sliding section 43 that faces sliding surface 21a in height direction D2. Rack section 44 has a row of teeth on which teeth and grooves forming unevenness in height direction D2 are alternately formed in moving directions D1. When pinion gear P of transmission member 32d rotates, the teeth of pinion gear P mesh with the teeth of rack section 44, so that slider 4 moves in moving directions D1. Note that the power transmission section is not necessarily a rack section and is variable according to the configuration of driving section 3.

Guided surfaces 45a and 45b extend facing the pair of guide walls 21c and 21d as illustrated in FIG. 3. Guided surfaces 45a and 45b are guided by the pair of guide walls 21c and 21d in casing 2 and stably move slider 4 in casing 2. The shapes and configurations of the pair of guided surfaces 45a and 45b and the pair of guide walls 21c and 21d are not particularly limited as long as they can stably move slider 4 in moving directions D1 in casing 2. In the present embodiment, guided surfaces 45a and 45b are provided in parallel and facing each other in width direction D3 of slider 4. In the present embodiment, the pair of guided surfaces 45a and 45b are formed as flat surfaces that respectively make surface contact with guide walls 21c and 21d formed as flat surfaces. Note that, in a case where the pair of guide walls are curved surfaces, for example, the pair of guided surfaces may be curved surfaces that can be guided in moving directions D1 along the curved surfaces of the guide walls. Further, the guided surfaces may have guide grooves or guide protrusions that engage with guide protrusions or guide grooves provided on guide walls 21c and 21d as long as they are guided so that slider 4 stably moves in moving directions D1.

Figure 4:
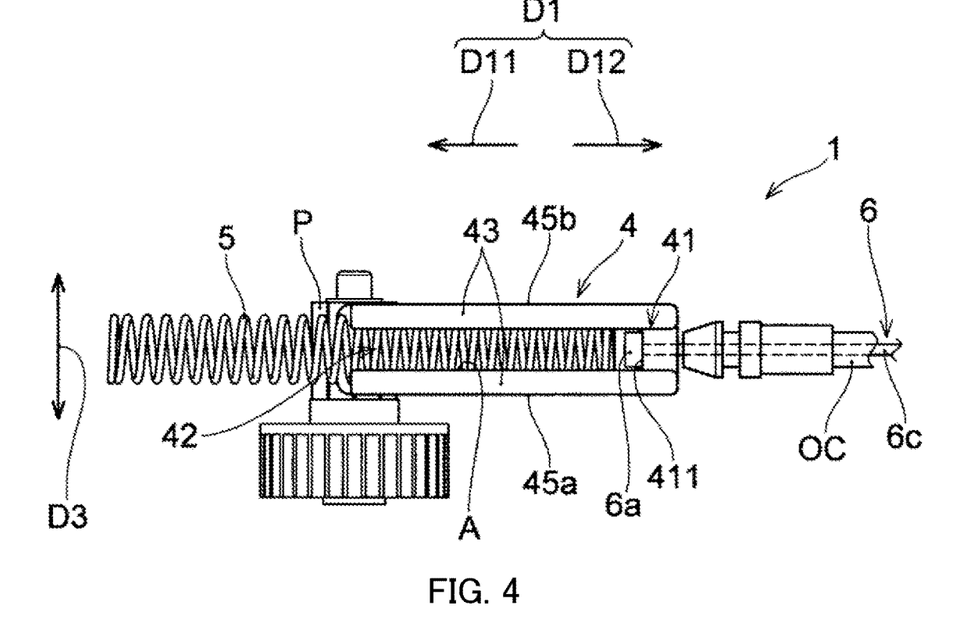
FIG. 4 is a schematic view of the slider of the driving apparatus in FIG. 1 from the bottom surface side.

Sliding section 43 slides relative to sliding surface 21a of casing 2 as slider 4 moves in moving directions D1. Sliding section 43 may be a flat surface or may be configured to be guided in moving directions D1 by engaging with a guide protrusion or a guide groove provided on sliding surface 21a, as long as slider 4 can smoothly move in moving directions D1. In the present embodiment, spring accommodating section 42 of slider 4 has aperture A extending along moving directions D1 of slider 4 in a position facing sliding surface 21a, as illustrated in FIG. 3 and FIG. 4. Sliding section 43 is portions of slider 4 facing sliding surface 21a (bottom wall W4 in the present embodiment) extending along moving directions D1 on both sides of aperture A in width direction D3 so as to have aperture A in between. This reduces the contact area of sliding section 43 and sliding surface 21a of casing 2, thereby reducing the sliding resistance of slider 4. In addition, providing aperture A makes slider 4 small in size, which will be described later. Further, providing aperture A makes it possible to easily check the state in the internal space of slider 4, such as the connection state between slider 4 and coil spring 5.

Spring accommodating section 42 is a portion of slider 4 having an internal space that can accommodate a part of coil spring 5. Spring accommodating section 42 extends along moving directions D1 in slider 4. The shape of spring accommodating section 42 is not particularly limited as long as it extends along moving directions D1 and can accommodate a part of coil spring 5. In the present embodiment, the internal space of spring accommodating section 42 is defined by side walls W1 and W2 and upper wall W3. Spring accommodating section 42 extends in moving directions D1 from the end of slider 4 opposite to the end where engaging section 41 is provided to the portion where engaging section 41 is provided.

In the present embodiment, as illustrated in FIG. 3, spring accommodating section 42 has inner surface IS curved along the outer circumference of coil spring 5. Inner surface IS guides coil spring 5 by partially contacting the outer circumference of coil spring 5 in the circumferential direction. Inner surface IS of spring accommodating section 42 guides the outer circumference of coil spring 5, thereby stably expanding and contracting coil spring 5.

In the present embodiment, coil spring 5 partially accommodated in spring accommodating section 42 is a compressed coil spring with a telescopic shaft in moving directions D1. In the initial state illustrated in FIG. 1, a part of coil spring 5 in moving directions D1 is accommodated in spring accommodating section 42, and the rest is exposed from slider 4. One end of coil spring 5 is supported by spring seat SS (see FIG. 2) provided at the end of spring accommodating section 42 on the engaging section 41 side, and the other end of coil spring 5 is supported by end wall 21e of casing 2. Coil spring 5 contracts when slider 4 moves in first moving direction D11 (see FIG. 5), and coil spring 5 expands when slider 4 moves in second moving direction D12 (see FIG. 1). Note that coil spring 5 may be accommodated in cylindrical spring case SC as in the embodiment to be described later (see FIG. 7 and FIG. 12).

Figure 5:
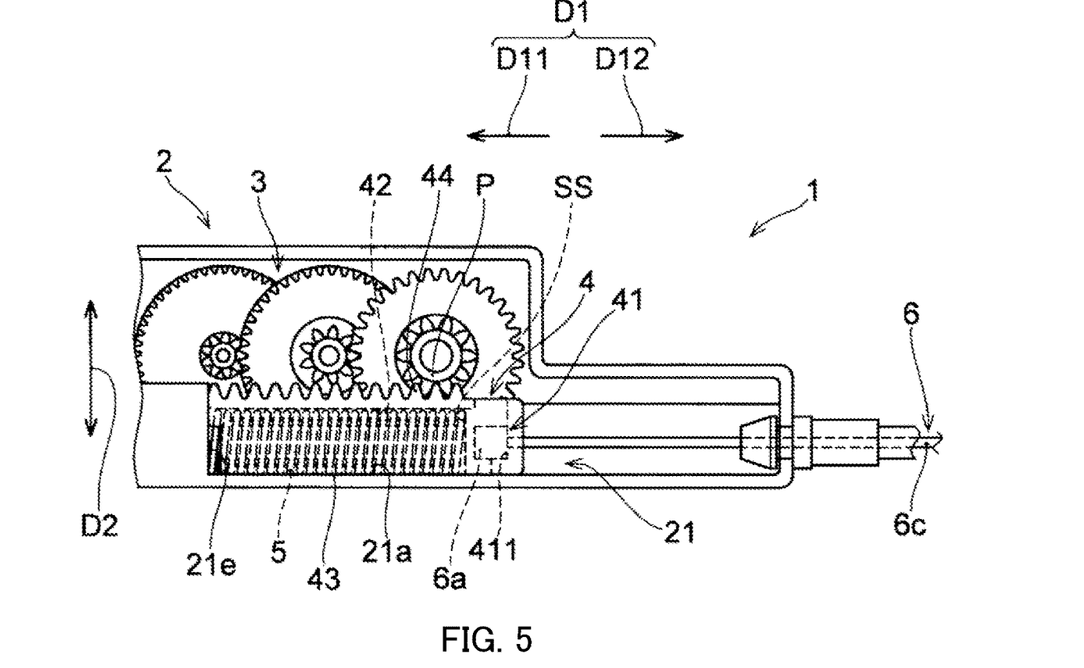
FIG. 5 is a schematic side view illustrating a state where a driving section is driven and the slider is moved in a first moving direction from the state illustrated in FIG. 2.
Figure 6:
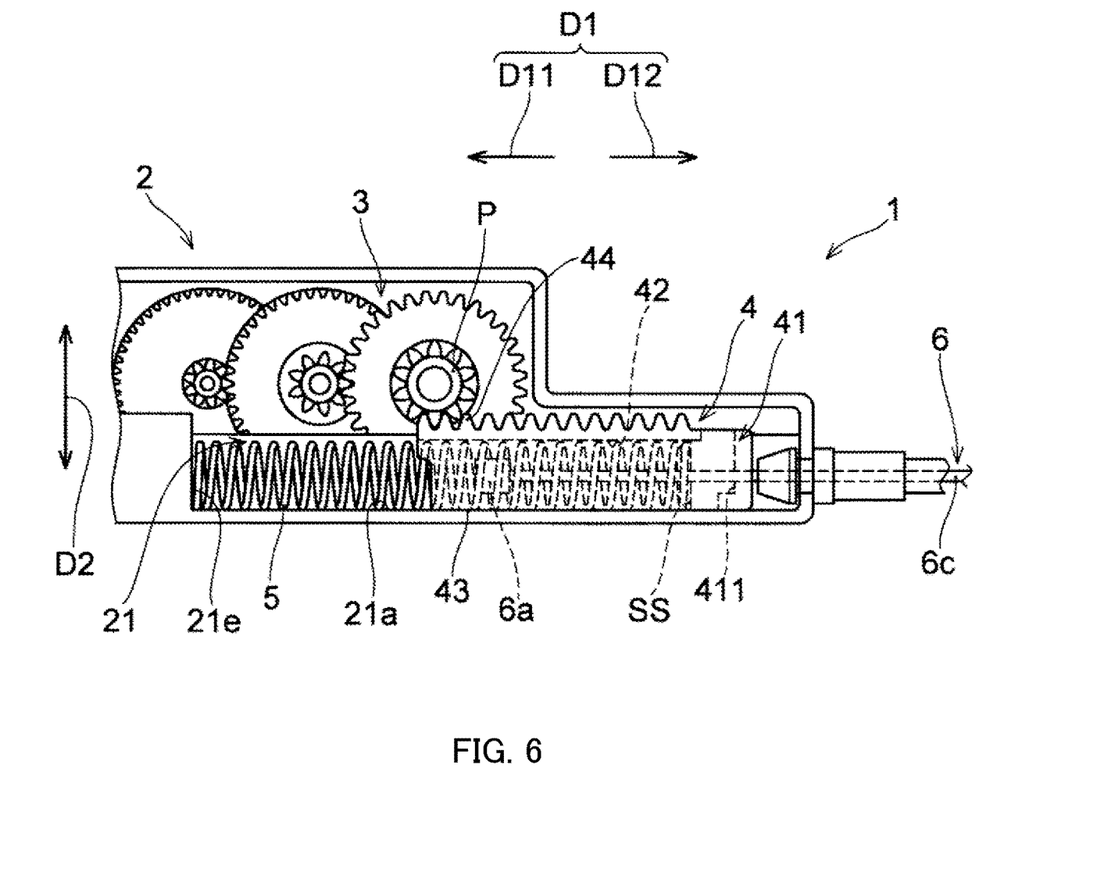
FIG. 6 is a schematic side view illustrating a state where the slider is moved in a second moving direction by the biasing force of a coil spring from the state illustrated in FIG. 5.

In the present embodiment, as illustrated in FIG. 2 and FIG. 5, slider 4 moves in association with cable 6 when slider 4 moves to the one side (first moving direction D11) of moving directions D1 due to the driving force of driving section 3. In addition, as illustrated in FIG. 5 and FIG. 6, slider 4 moves relative to cable 6 when slider 4 moves to the other side (second moving direction D12) of moving directions D1 due to the biasing force of coil spring 5. To be more specific, when driving section 3 is driven, the driving force of driving section 3 causes slider 4 to move in first moving direction D11 from the initial state illustrated in FIG. 1 and FIG. 2 against the biasing force of coil spring 5 that biases slider 4 in second moving direction D12 (see FIG. 5). When slider 4 moves in first moving direction D11, cable 6 with cable end 6a engaged with engaging section 41 moves in first moving direction D11 with slider 4. When the driving force of driving section 3 is released, slider 4 moves in second moving direction D12 from the state illustrated in FIG. 5 by the biasing force of coil spring 5 (see FIG. 6). At this time, transmission members 32a, 32b, 32c, and 32d rotate in a direction opposite to the rotation direction when slider 4 moves in first moving direction D11, by the force applied from slider 4 moving in second moving direction D12 due to the biasing force of coil spring 5. When slider 4 moves in second moving direction D12 from the state illustrated in FIG. 5, slider 4 moves relative to cable end 6a of cable 6, and cable end 6a is left in place (see FIG. 6) since cable end 6a is not engaged so as to move in second moving direction D12 with the movement of slider 4. Note that, in the present embodiment, cable end 6a is moved in second moving direction D12 by a biasing member provided on the operation object OP side after delay for to the movement of slider 4 in second moving direction D12, as described above.

Here, coil spring 5 accommodated in spring accommodating section 42 and cable 6 are placed on the same axis along moving directions D1 of slider 4 as illustrated in FIG. 1 to FIG. 3. Thus, when slider 4 is moved to the other side (second moving direction D12) of moving directions D1 by the biasing force of coil spring 5, coil spring 5 is configured to expand while accommodating cable end 6*a* of cable 6 in the inner space that is inside the inner circumference of coil spring 5 (see FIG. 6). In other words, cable end 6*a* of cable 6 is movable in moving directions D1 relative to coil spring 5 in the inner space of coil spring 5. This allows cable end 6*a* to move relative to coil spring 5 in the inner space of coil spring 5 in driving apparatus 1 that operates with coil spring 5 and cable end 6*a* overlapped in moving directions D1. Thus, slider 4 can be smaller in size in driving apparatus 1 of the present embodiment, unlike the configuration in which a moving space for a coil spring and a moving space for a cable end are separately provided in a slider while being shifted in the thickness direction as in PTL 1. This allows driving apparatus 1 to be smaller in size as a whole. Further, the extension axis of coil spring 5 and the axis of cable 6 are coaxial with each other, and thus the inclining force with respect to moving directions D1 is difficult to be applied to slider 4 when slider 4 operates due to the biasing force of coil spring 5 or operates against the biasing force of coil spring 5, thereby slider 4 can be moved stably.

Further, as described above, in the present embodiment, spring accommodating section 42 of slider 4 includes aperture A extending along moving directions D1 of slider 4 in a position facing sliding surface 21*a*, as illustrated in FIG. 3 and FIG. 4. Aperture A is formed over the area where coil spring 5 is provided in moving directions D1. Providing this aperture A makes it possible not only to reduce the sliding resistance of slider 4 but also to reduce the size of slider 4 in the radial direction of coil spring 5. To be more specific, as illustrated in FIG. 3, a portion of coil spring 5 in the circumferential direction (lower end portion of coil spring 5 in FIG. 3) goes into the space of bottom wall W4 that forms aperture A without contacting sliding surface 21*a*. This eliminates the need for a wall portion of slider 4 in a direction radially facing the portion of coil spring 5 in the circumferential direction (lower end portion of coil spring 5 in FIG. 3), and the size of slider 4 in the radial direction of coil spring 5 can be reduced by the thickness of the wall portion (bottom wall W4 in the present embodiment) that can be eliminated. Note that the sliding surface is bottom surface 21*a* of casing 2 and it is possible to reduce the size of slider 4 in height direction D2 of casing 2 in the present embodiment, but in a case where the sliding surface is one (or the other) of side walls W1 and W2, for example, it is also possible to form an aperture on side wall W1 or W2 and reduce the size of slider 4 in width direction D3.

In the present embodiment, spring accommodating section 42 is defined by rack section 44 (upper wall W3) and a pair of guided surfaces 45*a* and 45*b* (side walls W1 and W2), and aperture A is formed on the opposite side of rack section 44 in a direction in which pinion gear P and rack section 44 face each other (height direction D2), as illustrated in FIG. 3. In this case, the engagement of pinion gear P and rack section 44 causes slider 4 to slide while being pressed toward the sliding surface (bottom surface) 21*a* side of slider accommodating section 21 in height direction D2. In the present embodiment, although slider 4 is pressed to sliding surface (bottom surface) 21*a*, the sliding resistance of slider 4 is reduced by providing aperture A on bottom wall W4 that includes sliding section 43 and faces sliding surface (bottom surface) 21*a*. Accordingly, slider 4 moves smoothly in moving directions D1.

Embodiment 2

Next, driving apparatus 1 according to Embodiment 2 will be described with reference to FIG. 7 to FIG. 12. In the following description, a description of matters common to the above-described embodiment will be omitted, and differences will be mainly described. Note that the configuration of the present embodiment and the contents described in Embodiment 1 can be used in combination.

Figure 7:
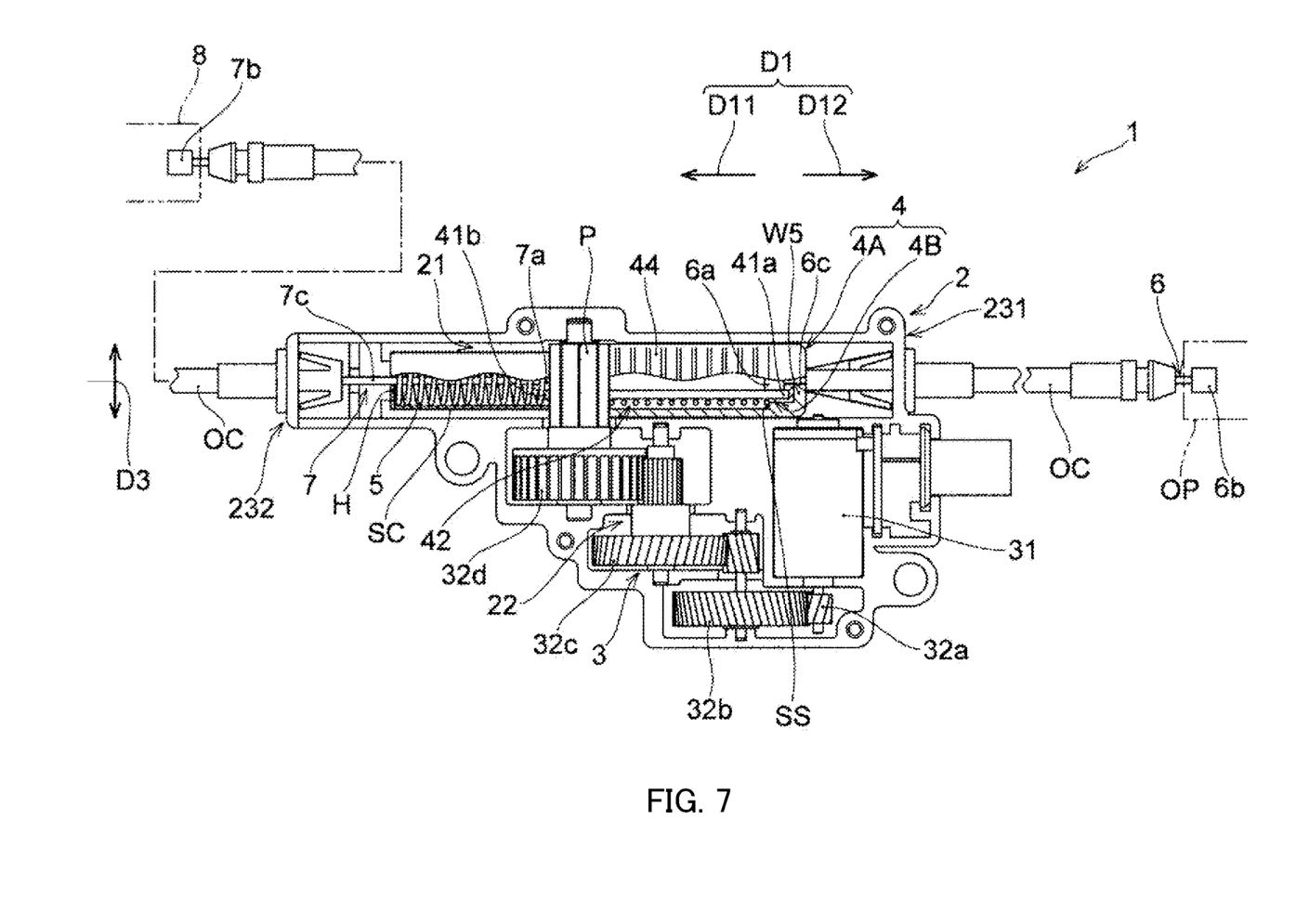
FIG. 7 is a top view illustrating the initial state of the driving apparatus according to Embodiment 2 of the present invention.
Figure 8:
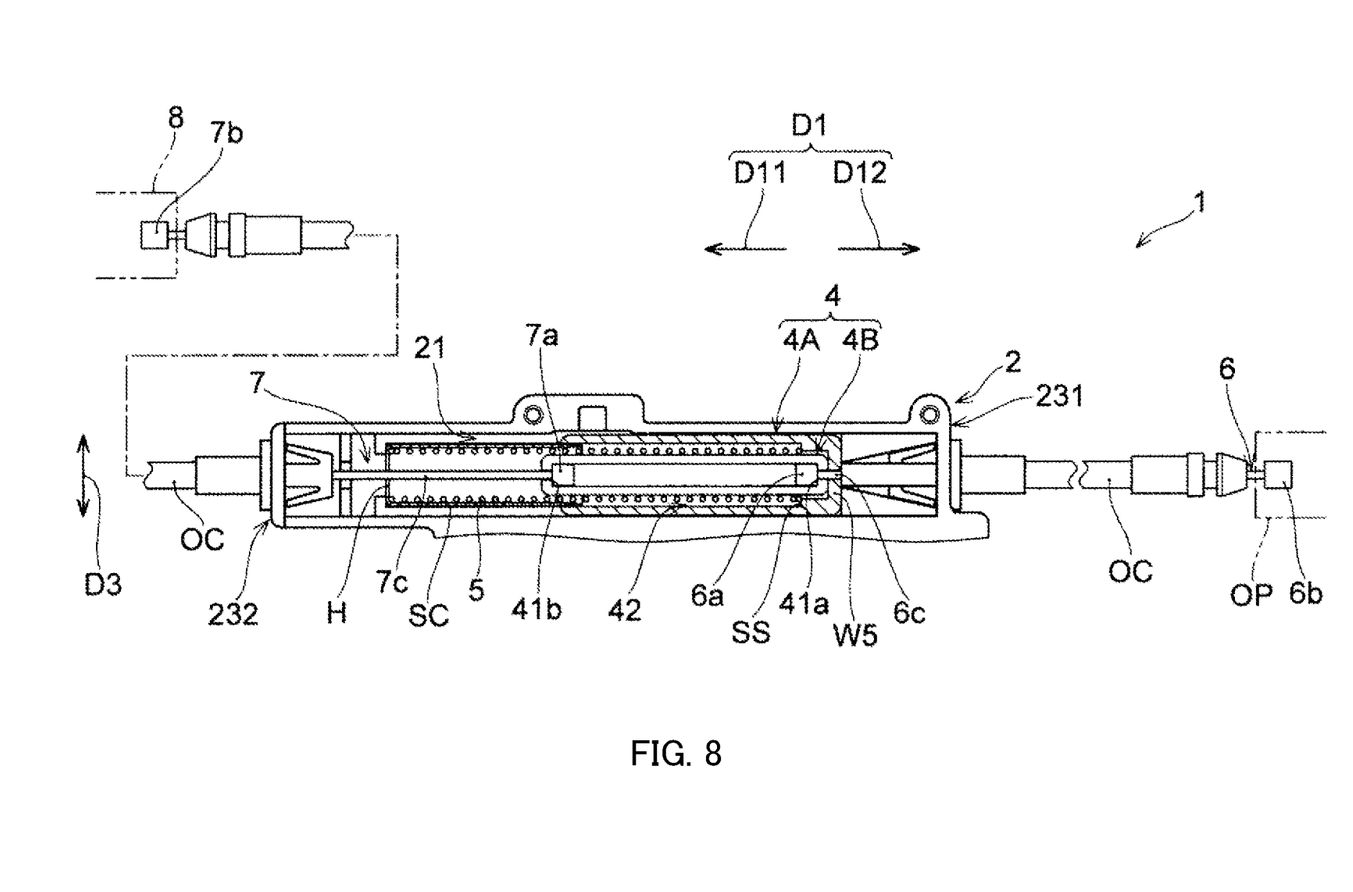
FIG. 8 is a schematic top view illustrating the slider of the driving apparatus illustrated in FIG. 7 with a rack section removed (driving section not illustrated)

In the present embodiment, driving apparatus 1 further includes, in addition to cable 6, second cable 7 with second cable end 7*a* (hereinafter simply referred to as cable end 7*a*) directly or indirectly attached to slider 4, as illustrated in FIG. 7. In addition, in the present embodiment, slider 4 includes slider body 4A that has spring accommodating section 42 and moves in moving directions D1 by the transmitted driving force of driving section 3, and auxiliary slider 4B that is provided so as to be movable in moving directions D1 relative to slider body 4A, as illustrated in FIG. 7 and FIG. 8.

Driving apparatus 1 of the present embodiment includes two cables (cable 6 and second cable 7). The use of each of the two cables (cable 6 and second cable 7) is not particularly limited, but in the present embodiment, cable 6 (hereinafter, referred to as first cable 6) is a cable for electric operation operated by the driving force of driving section 3, and second cable 7 is a cable for manual operation. To be more specific, in driving apparatus 1 of the present embodiment, first cable 6 can be operated by the driving force of driving section 3, and first cable 6 can also be operated by the manual operation of second cable 7. In this case, for example, when driving section 3 does not operate due to a failure or the like, or when it is desired to selectively enable manual operation, operation object OP can be operated by the operation of second cable 7. As described above, driving apparatus 1 of the present embodiment can operate first cable 6 by either the electric operation by driving section 3 or the manual operation by second cable 7.

First cable 6 is connected to slider 4 and is operated by the movement of slider 4. In the present embodiment, cable end 6*a* of first cable 6 is connected to slider 4. To be more specific, cable end 6*a* is connected to first engaging section 41*a* provided at one end (end on the second moving direction D12 side) of auxiliary slider 4B of slider 4 in moving directions D1, as illustrated in FIG. 7 and FIG. 8. Cable end 6*b* at the other end of first cable 6 is connected to operation object OP as illustrated in FIG. 7 and FIG. 8. First cable 6 is inserted into outer casing OC and is routed in a predetermined routing path by outer casing OC in a mounting object such as a vehicle body.

Second cable 7 is connected to auxiliary slider 4B of slider 4, and when second cable 7 is operated, auxiliary slider 4B to which second cable 7 is connected moves in moving directions D1. When second cable 7 moves auxiliary slider 4B in moving directions D1, first cable 6 connected to auxiliary slider 4B is pulled. Second cable 7 includes cable end 7*a* provided on one end side of second cable 7, cable end 7*b* provided on the other end side of second cable 7, and cable body 7*c*, as illustrated in FIG. 7. In the present embodiment, cable end 7*a* of second cable 7 is connected to second engaging section 41*b* provided at the other end (end on the first moving direction D11 side) of auxiliary slider 4B of slider 4 in moving directions D1, as illustrated in FIG. 7 and FIG. 8. Cable end 7b on the other end side of second cable 7 is connected to operation section 8 that operates second cable 7, as illustrated in FIG. 7 and FIG. 8. Second cable 7 is inserted into outer casing OC and is routed in a predetermined routing path by outer casing OC in a mounting object such as a vehicle body. Note that operation section 8 may be an operating lever or the like that can be manually operated, or may be an operation section that can be electrically operated.

In the present embodiment, casing 2 includes slider accommodating section 21 that slidably accommodates slider 4, driving section accommodating section 22 that accommodates driving section 3, first cable lead-in part 231 that is provided on one side (second moving direction D12 side) of slider accommodating section 21 in moving directions D1 and leads first cable 6 into the inside of casing 2, and second cable lead-in part 232 that is provided on the other side (first moving direction D11 side) of slider accommodating section 21 in moving directions D1 and leads second cable 7 into the inside of casing 2, as illustrated in FIG. 7.

Figure 12:
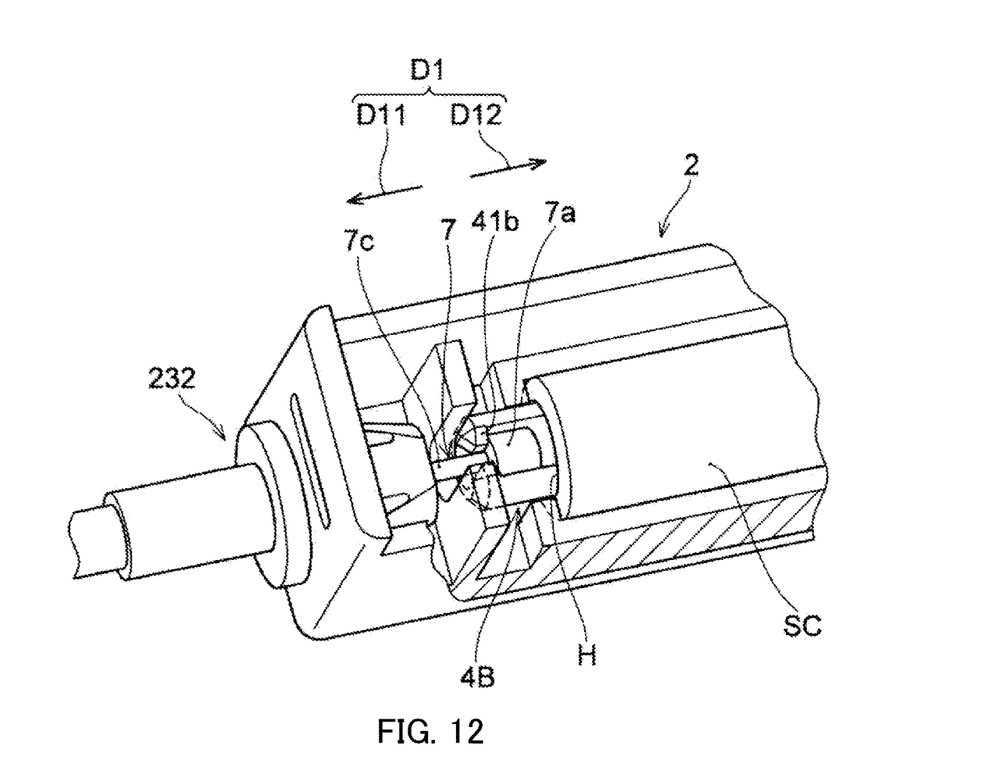
FIG. 12 is a perspective view illustrating a state where the auxiliary slider is protruded from a through hole of a spring case.

In the present embodiment, slider accommodating section 21 is provided with slider 4 including slider body 4A and auxiliary slider 4B, and coil spring 5, as illustrated in FIG. 7 and FIG. 8. Note that coil spring 5 is accommodated in spring case SC in the present embodiment. In a case where spring case SC is provided, coil spring 5 can be easily assembled to slider accommodating section 21 since coil spring 5 stably expands and contracts along the extension axis in spring case SC. The outer circumference of coil spring is covered by spring case SC and the slider (slider body 4A) except for the portion corresponding to aperture A described above. Note that, in the present embodiment, spring case SC includes through hole H at the end on one side (first moving direction D11 side) of moving directions D1 so that auxiliary slider 4B can pass through, as illustrated in FIG. 12. In a case where through hole H is provided at the end of spring case SC, auxiliary slider 4B can move in moving directions D1 through through hole H when auxiliary slider 4B moves in first moving directions D1. In addition, when cable end 7a is assembled to auxiliary slider 4B after spring case SC and slider 4 are attached to slider accommodating section 21, it is possible to place second engaging section 41b of auxiliary slider 4B outside spring case SC by moving auxiliary slider 4B to the position illustrated in FIG. 12 through through hole H. This makes it easy to assemble cable end 7a to auxiliary slider 4B. Further, in the case where through hole H is provided, the moving range of auxiliary slider 4B in moving directions D1 is not restricted by spring case SC, slider body 4A, or the like. Thus, the stroke of auxiliary slider 4B in moving directions D1 can be set more flexibly.

Figure 9:
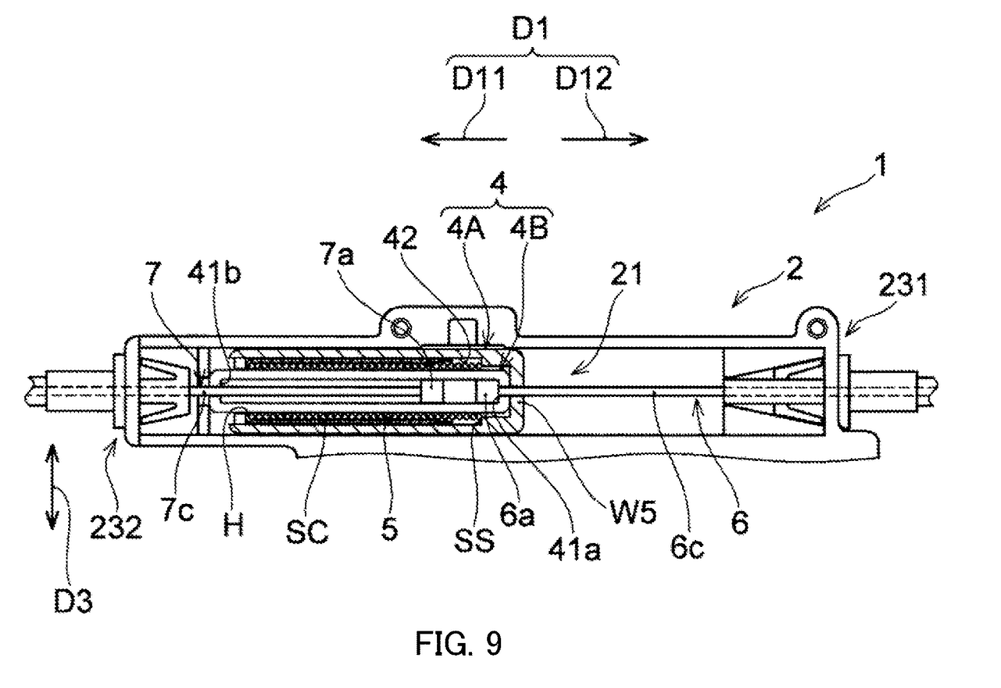
FIG. 9 is a schematic top view illustrating a state where the driving section is driven and the slider is moved in the first moving direction from the state illustrated in FIG. 8.

Slider body 4A moves in moving directions D1 due to the driving force of driving section 3. As illustrated in FIG. 9, when slider body 4A moves due to the driving force of driving section 3 in first moving direction D11, slider body 4A engages with auxiliary slider 4B and moves auxiliary slider 4B in first moving direction D11, in the present embodiment. This operates first cable 6 connected to auxiliary slider 4B.

Slider body 4A includes spring accommodating section 42 as illustrated in FIG. 7 and FIG. 8, and coil spring 5 is accommodated in spring accommodating section 42. One end (end on the second moving direction D12 side) of coil spring 5 is supported by spring seat SS of slider body 4A, and the other end (end on the first moving direction D11 side) of coil spring 5 is supported by the end of spring case SC on the first moving direction D11 side. In addition, slider body 4A accommodates auxiliary slider 4B so as to be relatively movable in moving directions D1. To be more specific, slider body 4A is configured to engage with auxiliary slider 4B and move with auxiliary slider 4B when moving in first moving direction D11 (see FIG. 9). Meanwhile, when moving in second moving direction D12, such as when moving from the state illustrated in FIG. 9 to the state illustrated in FIG. 10, slider body 4A is configured to move relative to auxiliary slider 4B without engaging with auxiliary slider 4B. Slider body 4A includes engaging wall portion W5 that is engageable with the end of auxiliary slider 4B in moving directions D1 at the end of slider body 4A on the second moving direction D12 side. As a result, when slider body 4A moves in first moving direction D11, engaging wall portion W5 of slider body 4A and the end (end on the second moving direction D12 side) of auxiliary slider 4B are engaged with each other, and both slider body 4A and auxiliary slider 4B move in first moving direction D11. Meanwhile, slider body 4A is not provided with a part that engages with auxiliary slider 4B when slider body 4A moves relative to auxiliary slider 4B in second moving direction D12 (when slider body 4A is moved by coil spring 5 in second moving direction D12 (see FIG. 10) and when auxiliary slider 4B moves in first moving direction D11 with respect to slider body 4A (see FIG. 11)). This enables relative movement between slider body 4A and auxiliary slider 4B.

Auxiliary slider 4B is connected to first cable 6 and second cable 7 and is provided so as to be movable in moving directions D1 relative to slider body 4A. Auxiliary slider 4B extends in moving directions D1 and is provided with first engaging section 41a to which cable end 6a of first cable 6 is directly or indirectly attached at one end (end on the second moving direction D12 side) of auxiliary slider 4B, and second engaging section 41b to which cable end 7a of second cable 7 is directly or indirectly attached at the other end (end on the first moving direction D11 side) of auxiliary slider 4B, as illustrated in FIG. 8. In the present embodiment, auxiliary slider 4B has a moving space in which cable end 6a of first cable 6 and cable end 7a of second cable 7 are movable in moving directions D1 according to the operation status of driving apparatus 1, as illustrated in FIG. 8 to FIG. 11. In the present embodiment, the moving space of auxiliary slider 4B is formed as a groove extending along moving directions D1 in which cable end 6a and cable end 7a are movable.

In the present embodiment, auxiliary slider 4B is configured to be movable in the inner space of coil spring 5 in spring accommodating section 42 of slider body 4A, as illustrated in FIG. 7 and FIG. 8. To be more specific, auxiliary slider 4B is formed in a size to fit in the inner space of coil spring 5 and is configured to be movable in moving directions D1 in the inner space of coil spring 5. In the present embodiment, auxiliary slider 4B is formed in a substantially cylindrical shape having grooves capable of accommodating cable end 6a and cable end 7a.

Also in the present embodiment, coil spring 5 is configured to expand while accommodating cable end 6a of first cable 6 and cable end 7a of second cable 7 in the inner space, which is inside the inner circumference of coil spring 5, via auxiliary slider 4B. In other words, cable end 6a and cable end 7a are movable in moving directions D1 relative to coil spring 5 in auxiliary slider 4B placed in the inner space of coil spring 5. This allows cable ends 6a and 7a to move relative to coil spring 5 in the inner space of coil spring 5 in driving apparatus 1 that operates with coil spring 5 and cable ends 6a and 7a overlapped in moving directions D1. Thus, slider 4 can be smaller in size in driving apparatus 1 of the present embodiment, unlike the configuration in which a moving space for a coil spring and a moving space for a cable end are separately provided in a slider while being shifted in the thickness direction as in PTL 1. This allows driving apparatus 1 to be smaller in size as a whole. Further, the extension axis of coil spring 5 and the axes of first cable 6 and second cable 7 are coaxial with each other, and thus the inclining force with respect to moving directions D1 is difficult to be applied to slider 4 when slider 4 operates due to the biasing force of coil spring 5 or operates against the biasing force of coil spring 5, thereby stably moving slider 4. Furthermore, in the present embodiment, placing auxiliary slider 4B inside coil spring 5 allows auxiliary slider 4B to function as a core of coil spring 5, thereby preventing deformation of coil spring 5 to distort radially outward with respect to the telescopic shaft of coil spring 5 and allowing slider 4 to move more stably in moving directions D1.

Figure 11:
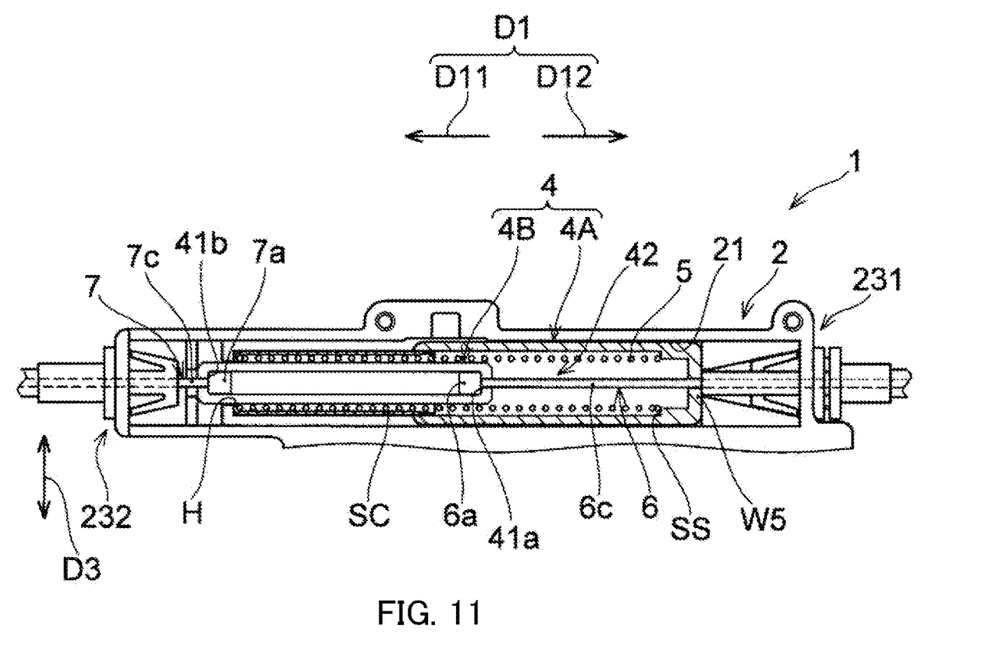
FIG. 11 is a schematic top view illustrating a state where a second cable is operated and an auxiliary slider is moved in the first moving direction from the state illustrated in FIG. 8.

In the present embodiment, coil spring 5 biases only slider body 4A among slider body 4A and auxiliary slider 4B, as illustrated in FIG. 7 and FIG. 8. To be more specific, one end (end on the second moving direction D12 side) of coil spring 5 is supported by spring seat SS provided in slider body 4A; accordingly, slider body 4A is biased toward second moving direction D12. Meanwhile, auxiliary slider 4B is not engaged with coil spring 5 and is not affected by the biasing force of coil spring 5 when auxiliary slider 4B moves in first moving direction D11, as illustrated in FIG. 11. Thus, the biasing force of coil spring 5 is not applied when second cable 7 is pulled to move auxiliary slider 4B in moving direction D1 (first moving direction D11), unlike when driving section 3 is operated. This eliminates the need for the force to resist the biasing force of coil spring 5 when second cable 7 is operated, so that second cable 7 can be operated with light force.

Next, operations of driving apparatus 1 of the present embodiment will be described in detail. Note that the following description is merely an example, and the driving apparatus of the present invention is not limited to the following description.

As illustrated in FIG. 7 and FIG. 8, in the initial state where no driving force of driving section 3 is applied, auxiliary slider 4B is placed so that one end (end on the right side in FIG. 8) of auxiliary slider 4B, which is on the other side (second moving direction D12 side) of moving directions D1, is located at the end (end on the right side in FIG. 8) of slider body 4A on the other side (second moving direction D12 side) of moving directions D1. In the present embodiment, the initial state of driving apparatus 1 can be realized when first cable 6 is pulled in second moving direction D12 by a biasing member (not illustrated) provided on the operation object OP side and auxiliary slider 4B moves in second moving direction D12.

When driving section 3 is driven in the initial state illustrated in FIG. 7 and FIG. 8, pinion gear P is rotated by the driving force of driving section 3 transmitted through transmission members 32a, 32b, 32c, and 32d, and the driving force is transmitted to rack section 44 of slider body 4A. This causes slider body 4A to move in first moving direction D11 against the biasing force of coil spring 5 that biases slider 4 in second moving direction D12 (see FIG. 9). When slider body 4A moves in first moving direction D11, auxiliary slider 4B engaged with slider body 4A also moves in first moving direction D11. As a result, first cable 6 with cable end 6a engaged with first engaging section 41a of auxiliary slider 4B is pulled in first moving direction D11 and moves in first moving direction D11 with slider body 4A and auxiliary slider 4B. This operates operation object OP connected to first cable 6.

Figure 10:
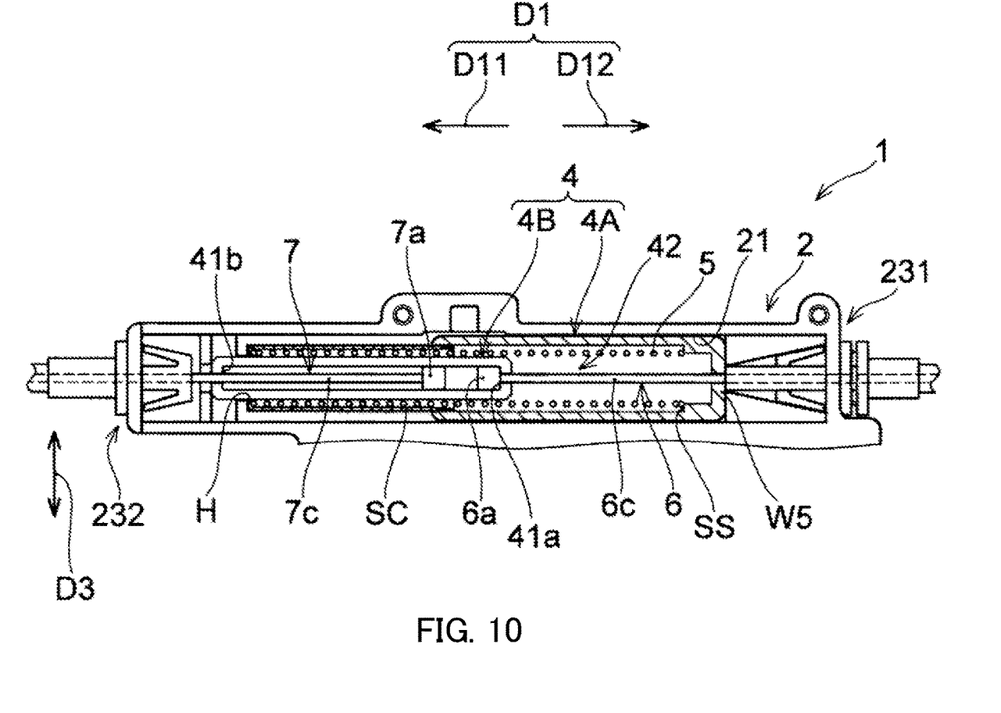
FIG. 10 is a schematic top view illustrating a state where the slider is moved in the second moving direction by the biasing force of the coil spring from the state illustrated in FIG. 9.

When the driving force of driving section 3 is released, slider body 4A moves in second moving direction D12 by the biasing force of coil spring 5 (see FIG. 10). At this time, transmission members 32a, 32b, 32c, and 32d rotate in a direction opposite to the rotation direction when slider body 4A moves in first moving direction D11, by the force applied from slider body 4A moving in second moving direction D12 due to the biasing force of coil spring 5. When slider body 4A moves in second moving direction D12, slider body 4A moves relative to auxiliary slider 4B and cable ends 6a and 7a, and auxiliary slider 4B and cable ends 6a and 7a are left in place as illustrated in FIG. 10 since auxiliary slider 4B is not engaged to move with slider body 4A in second moving direction D12 as described above. Note that, in the present embodiment, auxiliary slider 4B and cable end 6a are moved in second moving direction D12 by a biasing member provided on the operation object OP side with a delay to the movement of slider 4 in second moving direction D12.

Meanwhile, when driving section 3 fails or when operation object OP is to be operated manually without using driving section 3, second cable 7 is operated as illustrated in FIG. 11. When second cable 7 is operated toward one side (first moving direction D11) of moving directions D1, auxiliary slider 4B moves relative to slider body 4A to one side (first moving direction D11) of moving directions D1 and first cable 6 is operated via auxiliary slider 4B as illustrated in FIG. 9 and FIG. 11. To be more specific, when second cable 7 is pulled in first moving direction D11, the force is applied in first moving direction D11 to auxiliary slider 4B to which cable end 7a of second cable 7 is connected and auxiliary slider 4B moves in first moving direction D11, as illustrated in FIG. 11. When auxiliary slider 4B moves in first moving direction D11, first cable 6 connected to auxiliary slider 4B is pulled in first moving direction D11, and operation object OP is operated. When auxiliary slider 4B moves in first moving direction D11, slider body 4A is not engaged with auxiliary slider 4B and is biased in second moving direction D12 by coil spring 5. Thus, slider body 4A does not move with auxiliary slider 4B in first moving direction D11 and is stopped on the spot. Note that auxiliary slider 4B is not affected by the biasing force of coil spring 5 in second moving direction D12 when auxiliary slider 4B moves in first moving direction D11, as described above. Thus, the biasing force of coil spring 5 is not applied when second cable 7 is pulled to move auxiliary slider 4B in moving direction D1 (first moving direction D11), unlike when driving section 3 is operated. This eliminates the need for the force to resist the biasing force of coil spring 5 when second cable 7 is operated, so that second cable 7 can be operated with light force. After auxiliary slider 4B is operated by second cable 7, auxiliary slider 4B is moved in second moving direction D12 by a biasing member provided on the operation object OP side and returns to the initial position illustrated in FIG. 7 and FIG. 8.

REFERENCE SIGNS LIST

1 Driving apparatus
2 Casing
2A First casing member
2B Second casing member
21 Slider accommodating section
21a Sliding surface (bottom surface)

21b Upper surface
21c, 21d Guide wall (side wall)
21e, 21f End wall
22 Driving section accommodating section
23 Cable lead-in part
23a Lead-in opening
231 First cable lead-in part
232 Second cable lead-in part
3 Driving section
31 Motor
32a, 32b, 32c, 32d Transmission member
4 Slider
4A Slider body
4B Auxiliary slider
41 Engaging section
41a First engaging section
41b Second engaging section
411 Wall portion
42 Spring accommodation section
43 Sliding section
44 Power transmission section (rack section)
45a, 45b Guided surface
46 Cable insertion section
5 Coil spring
6 Cable (first cable)
6a, 6b Cable end of cable (first cable)
6c Cable body
7 Second cable
7a, 7b Cable end of second cable
7c Cable body
8 Operation section
A Aperture
D1 Moving direction
D11 First moving direction
D12 Second moving direction
D2 Height direction
D3 Width direction
H Through hole
IS Inner surface
OC Outer casing
OP Operation object
P Pinion gear
SC Spring case
SS Spring seat
W1, W2 Side wall of slider
W3 Upper wall of slider
W4 Bottom wall of slider
W5 Engaging wall portion of slider body

The invention claimed is:

1. A driving apparatus, comprising:
a casing;
a driving section;
a slider that moves in the casing along a predetermined moving direction due to a driving force of the driving section;
a coil spring that biases the slider in one direction; and
a cable that comprises a cable end directly or indirectly attached to the slider, wherein:
the slider comprises:
an engaging section to which the cable end is directly or indirectly attached; and
a spring accommodating section that extends along the moving direction and accommodates a part of the coil spring,
the slider moves in association with the cable when the slider moves to one side of the moving direction due to the driving force of the driving section, and moves relative to the cable when the slider moves to an other side of the moving direction due to a biasing force of the coil spring,
the coil spring accommodated in the spring accommodating section and the cable are coaxially placed along the moving direction of the slider, and
the coil spring is configured to expand, when the slider moves to the other side of the moving direction due to the biasing force of the coil spring, so as to be able to fully accommodate the cable end of the cable in an inner space that is inside an inner circumference of the coil spring.

2. The driving apparatus according to claim 1, wherein the spring accommodating section of the slider comprises an inner surface curved along a shape of an outer circumference of the coil spring, and the inner surface guides the coil spring by partially contacting the outer circumference of the coil spring in a circumferential direction.

3. The driving apparatus according to claim 1, wherein:
the casing comprises a sliding surface on which the slider slides, and
the spring accommodating section of the slider comprises an aperture that extends along the moving direction of the slider at a position facing the sliding surface.

4. The driving apparatus according to claim 3, wherein:
the casing comprises the sliding surface, and a pair of guide walls that extend substantially perpendicular to the sliding surface and along the moving direction of the slider,
the driving section comprises a pinion gear that engages with the slider,
the slider comprises:
a pair of plate guided surfaces that extend facing the pair of guide walls; and
a rack section that connects between the pair of guided surfaces and engages with the pinion gear,
the spring accommodating section is defined by the rack section and the pair of guided surfaces, and
the aperture is formed on a side opposite to the rack section in a direction in which the pinion gear and the rack section face each other.

5. The driving apparatus according to claim 1,
further comprising a second cable with a second cable end directly or indirectly attached to the slider,
wherein:
the slider comprises a slider body that comprises the spring accommodating section and moves in the moving direction when the driving force of the driving section is transmitted, and an auxiliary slider that is provided so as to be movable in the moving direction relative to the slider body,
the auxiliary slider is provided with an engaging section on one end and a second engaging section on an other end, the engaging section being a section to which the cable end of the cable is directly or indirectly attached, the second engaging section being a section to which the second cable end of the second cable is directly or indirectly attached, and
the coil spring biases only the slider body among the slider body and the auxiliary slider.

6. The driving apparatus according to claim 5, wherein:
the auxiliary slider is configured to move in the inner space of the coil spring in the spring accommodating section of the slider body,
in an initial state where the driving force of the driving section is not applied, the one end of the auxiliary slider on the other side of the moving direction is located at an end of the slider body on the other side of the moving direction, and when the second cable is operated to the one side of the moving direction, the auxiliary slider moves to the one side of the moving direction relative to the slider body and the cable is operated via the auxiliary slider.

7. The driving apparatus according to claim 6, wherein:

the cable is a cable for electric operation operated by the driving force of the driving section, and the second cable is a cable for manual operation.

* * * * *